United States Patent
Douglas et al.

(10) Patent No.: US 9,714,719 B2
(45) Date of Patent: Jul. 25, 2017

(54) BOTTOM OUTLET VALVE REMOVABLE INDEPENDENT STEAM JACKET

(71) Applicant: Union Tank Car Company, Chicago, IL (US)

(72) Inventors: Peter J. Douglas, Schereville, IN (US); Gary C. Walter, Chicago, IL (US); Joe Perez, Valparaiso, IN (US); Jonathan Schultz, Chicago, IL (US); Nathan Chilton, Chicago, IL (US); Keith Peltason, Chicago, IL (US)

(73) Assignee: Union Tank Car Company, Chicago, IL (US)

( * ) Notice: Subject to any disclaimer, the term of this patent is extended or adjusted under 35 U.S.C. 154(b) by 0 days.

(21) Appl. No.: 14/864,145

(22) Filed: Sep. 24, 2015

(65) Prior Publication Data

US 2017/0089479 A1    Mar. 30, 2017

(51) Int. Cl.
*F16K 27/12* (2006.01)
*F16L 53/00* (2006.01)
*F17D 1/08* (2006.01)

(52) U.S. Cl.
CPC ............ *F16K 27/12* (2013.01); *F16L 53/001* (2013.01); *F17D 1/08* (2013.01); *Y10T 137/7036* (2015.04)

(58) Field of Classification Search
CPC .... F16K 27/12; Y10T 137/7036; F16L 53/00; F16L 53/001; F16L 53/002; F17D 1/00; F17D 1/08
USPC ......... 137/375, 264, 336, 340; 222/131, 183
See application file for complete search history.

(56) References Cited

U.S. PATENT DOCUMENTS

| | | | | |
|---|---|---|---|---|
| 3,901,269 | A | * | 8/1975 | Henderson ............ F16K 49/005 137/340 |
| 4,203,472 | A | * | 5/1980 | Dulaney ................. E21B 33/00 137/13 |
| 4,624,189 | A | * | 11/1986 | Loevinger ............ B65D 88/744 105/451 |

* cited by examiner

*Primary Examiner* — Kevin Lee
(74) *Attorney, Agent, or Firm* — Banner & Witcoff, Ltd.

(57) ABSTRACT

A removable independent steam jacket for a bottom outlet valve of a railroad tank car able to connect to an existing bottom outlet valve, with or without an integral steam jacket, in a field environment without having to take the tank car in for repairs having a partially annular hollow base with a rectangular cross-section and a plurality of pipes connected to the base extending away from the bottom of the base. The removable steam jacket also has a plurality of mounting brackets connected to the bottom the base for installing and removing it from the bottom outlet valve.

20 Claims, 7 Drawing Sheets

FIG. 8

BOTTOM OUTLET VALVE REMOVABLE INDEPENDENT STEAM JACKET

BACKGROUND

Many railroad tank cars have bottom outlet valves (BOVs) to allow for a simple means of unloading the payload being transported, most of which are liquids. The BOVs are usually ball valves located at the bottom of the tank of the railroad tank car. The BOV is in a closed position to load the payload into tank car, and is in an open position to unload the payload through the BOV.

Since most payloads transported by tank cars are liquids, to ensure the payload drains properly through the open BOV, some BOVs have an integral steam jacket around the BOV. The steam jacket is used to heat the payload near the BOV lowering its viscosity, allowing it to flow easier through the BOV. However, the steam jackets can wear over time and some develop fatigue cracks within the inlet and outlet pipes. The only way to repair the system is to have the entire tank car taken out of service to repair it. The present invention addresses these problems. The creation of a removable independent BOV steam jacket that can be installed easily over an existing BOV with or without a steam jacket has tremendous benefits as it can be easily installed in the field keeping the tank car in service until its regularly scheduled maintenance.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of this disclosure relate to a bottom outlet valve (BOV) removable independent steam jacket of a railroad tank car comprising a base: comprising a first end cap, a second end cap, and a hollow tubing having a first end, a second end, a top wall, a bottom wall, an inner wall, and an outer wall where the first end cap is connected to the first end of the hollow tubing and the second end cap is connected to the second end of the hollow tubing forming an interior cavity. The removable steam jacket further comprises a plurality of mounting brackets connected to the bottom wall and a plurality of pipe assemblies located proximate the first end cap and the second end cap comprising a first pipe, a second pipe, a fitting, and a bushing, where the pipe assemblies extend away from the bottom wall of the tubing.

Additional aspects of this disclosure include a removable steam jacket comprising a tubing having a rectangular cross-section where the height is larger than the width. Also, a steam jacket where the tubing has a partial annular shape that extends beyond 180 degrees. Lastly, a steam jacket where the plurality of components are welded together.

Figure 3:
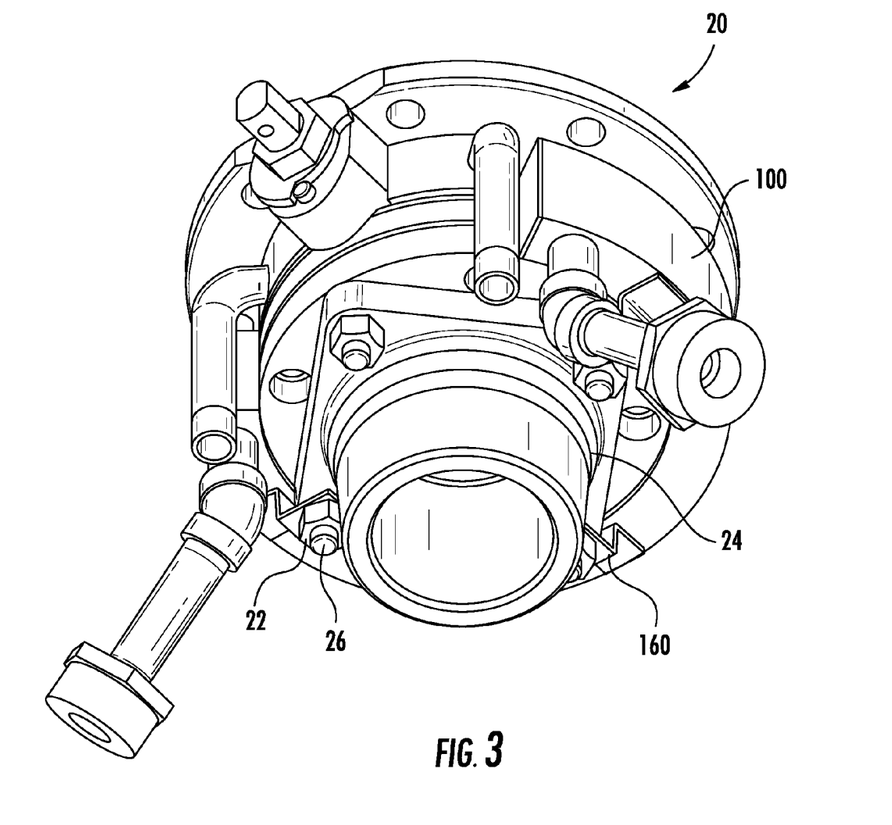
FIG. 3 depicts an isometric view of the example removable bottom outlet valve steam jacket of FIG. 1 installed around a bottom outlet valve, according to one or more aspects described herein.

Additional aspects of this disclosure include a removable steam jacket having a weight less than 25 pounds. The removable steam jacket may be installed by using a plurality of mechanical fasteners already existing on the tank car. For example, FIG. 3 shows an installed removable steam jacket that was installed using the process of removing a plurality of nuts from the nozzle outlet, installing the mounting brackets over the remaining bolts, and then reinstalling the plurality of nuts. The installation may be done with any type and any number of mechanical fasteners.

Additional aspects of this disclosure are a method for making an independent removable steam jacket comprising forming a base comprising a tubing having a first end, a second end, a top wall, a bottom wall, an inner wall, and an outer wall; integrally joining a first end cap to the first end of the tubing and a second end cap to the second end of the tubing; creating a hole in the bottom wall of the tubing near the first end and the second end; forming a plurality of pipe assemblies by connecting a first pipe, a fitting, a second pipe, and a bushing, where the second end of the first pipe connects to the first end of the fitting, the second end of the fitting connects to the first end of the second pipe, the second end of the second pipe connects to the first end of the bushing; forming a plurality of mounting brackets comprising a first wall, a second wall generally perpendicular to the first wall, and a third wall generally parallel to the first wall, and a hole; connecting the plurality of pipe assemblies to the base with a plurality of openings in the bottom wall of the tubing; connecting each mounting bracket to the bottom wall of the tubing.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Generally parallel" means that a first line, segment, plane, edge, surface, etc. is approximately (in this instance, within 5%) equidistant from with another line, plane, edge, surface, etc., over at least 50% of the length of the first line, segment, plane, edge, surface, etc.

"Generally perpendicular" means that a first line, segment, plane, edge, surface, etc. is approximately (in this instance, within 5%) oriented approximately 90 degrees from another line, plane, edge, surface, etc., over at least 50% of the length of the first line, segment, plane, edge, surface, etc.

"Plurality" indicates any number greater than one, either disjunctively or conjunctively, as necessary, up to an infinite number.

"Substantially constant" when referring to a dimension means that a value is approximately the same and varies no more than +/−5%.

"Integral joining technique" or means a technique for joining two pieces so that the two pieces effectively become a single, integral piece, including, but not limited to, irreversible joining techniques, such as welding, brazing, adhesively joining, cementing, or the like, where separation of the joined pieces cannot be accomplished without structural damage thereto. Pieces joined with such a technique are described as "integrally joined."

Figure 1:
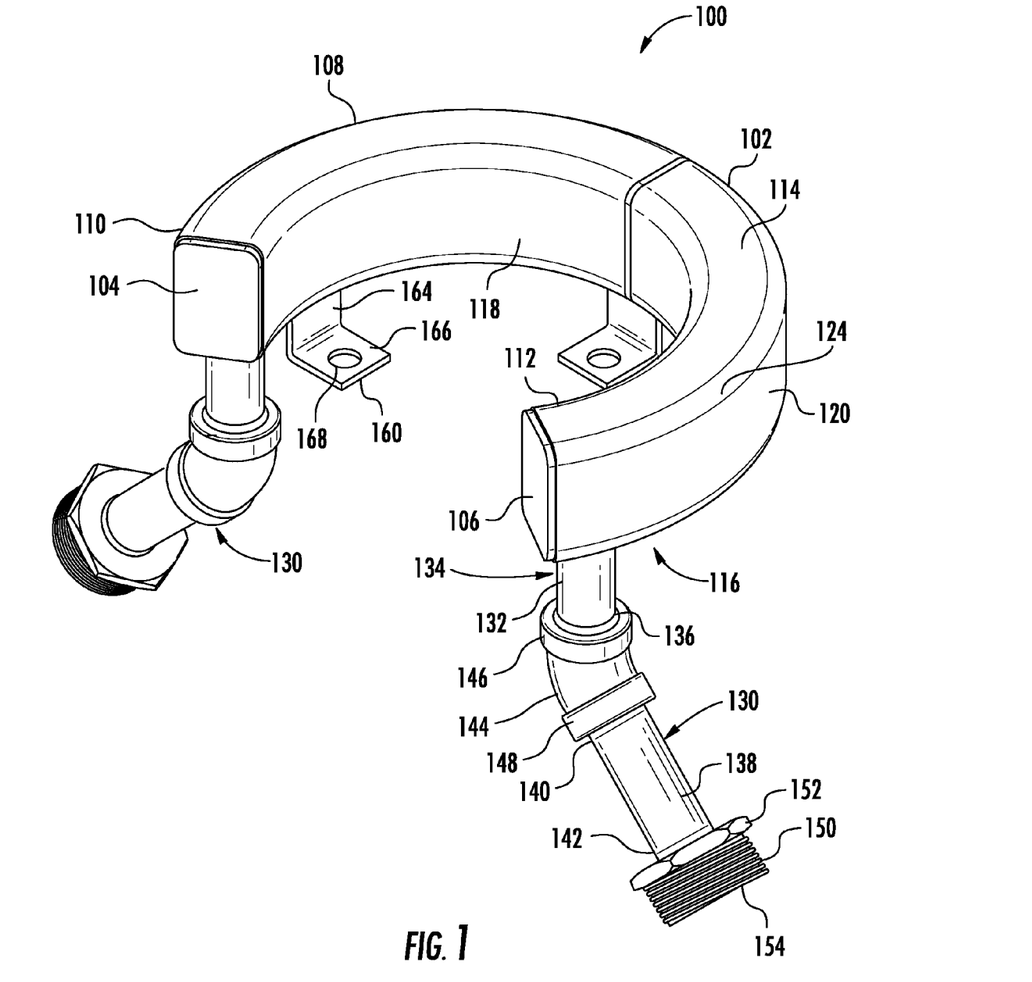
FIG. 1 depicts an isometric view of an example embodiment of a removable bottom outlet valve steam jacket, according to one or more aspects described herein.
Figure 2:
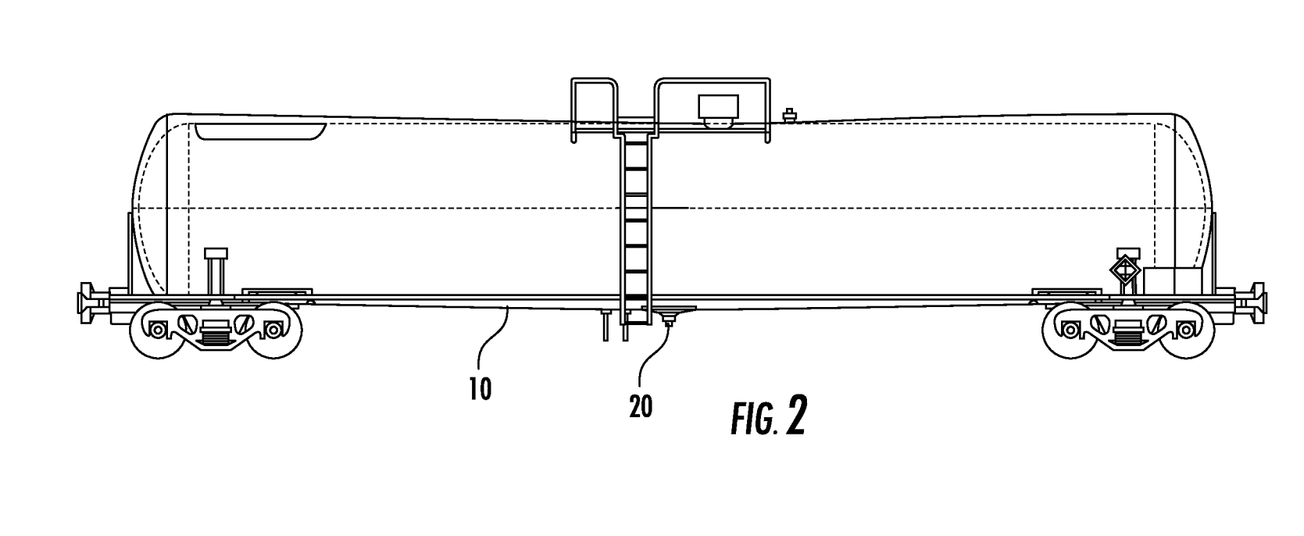
FIG. 2 shows a side view of an example railroad tank car with a bottom outlet valve.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope and spirit of the present disclosure FIG. 1 depicts an isometric view of a bottom outlet valve (BOV) removable independent steam jacket 100, according to one or more aspects described herein. FIG. 2 shows an example railroad tank car 10 and the location of the BOV 20 proximate the center of the tank car 10. Additionally, FIG. 3 shows an isometric view of the removable independent steam jacket 100 assembled to a nozzle outlet 24 of a BOV 20.

As illustrated in FIGS. 1 and 3, a BOV steam jacket 100 for a BOV 20 of a railroad tank car 10 may comprise a base 102 comprising a first end cap 104, a second end cap 106, and a hollow tubing 108. The hollow tubing 108 may include a first end 110, a second end 112, a top wall 114, a bottom wall 116, an inner wall 118, and an outer wall 120. The first end cap 104 may be connected to the first end 110 of the hollow tubing 108 and the second end cap 106 may be connected to the second end 112 of the hollow tubing 108 forming an interior cavity 122. The BOV steam jacket 100 may also comprise a plurality of mounting brackets 160 connected to the bottom wall 116, and a plurality of pipe assemblies 130 located proximate the first end cap 104 and the second end cap 106. The pipe assemblies 130 extend away from the bottom wall 116 of the tubing and may comprise a first pipe 132, a second pipe 138, a fitting 144, and a bushing 150. Other configurations of the pipe assemblies 130 may be utilized without departing from this invention.

The removable BOV steam jacket 100 enables the easy installation and removal by a team in the field. The weight of the BOV steam jacket 100 may be less than 25 pounds or may be less than 30 pounds. The removable BOV steam jacket 100 may be easily installed by using a plurality of mechanical fasteners already existing on the tank car 10. For example, FIG. 3 shows an installed BOV steam jacket 100. The BOV steam jacket 100 may be installed by removing a plurality of nuts 22 from the nozzle outlet 24, installing the mounting brackets 160 over the remaining bolts 26, and then reinstalling the plurality of nuts 22 to secure the BOV steam jacket 100 to the BOV 20. The installation may be done with any type and any number of mechanical fasteners.

Figure 6:
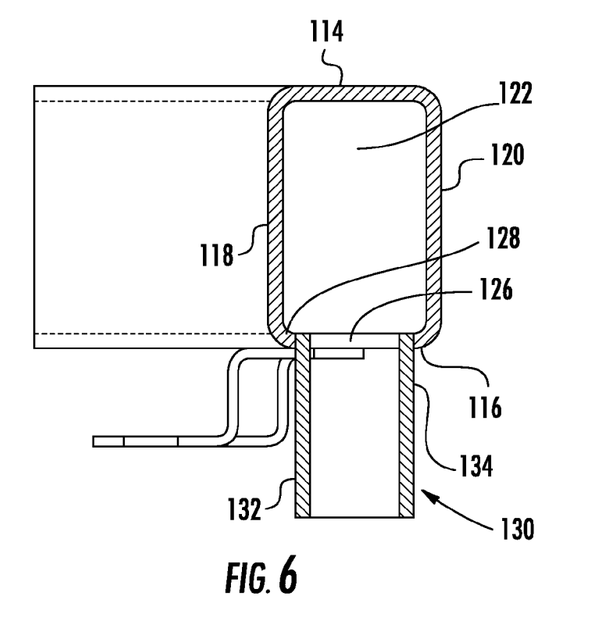
FIG. 6 depicts another cross-sectional view along line 6-6 in FIG. 4 of the example removable bottom outlet valve steam jacket of FIG. 1, according to one or more aspects described herein.

As shown in FIGS. 1 and 6, the base 102 comprises a first end cap 104, a second end cap 106, and tubing 108 with a first end 110, a second end 112, a top wall 114, a bottom wall 116, an inner wall 118, and an outer wall 120 that are connected to form an interior chamber 122. The top wall 114, bottom wall 116, inner wall 118, outer wall 120 may be formed as a rectangular tube with a substantially constant wall thickness. The corners between the walls may have a radius 124 between them. The tubing 108 may have a partial annular or ring-like shape.

The rectangular tube or tubing 108 may be formed as a unitary construction or of a plurality of components integrally joined together. The rectangular end caps 104, 106 may be connected onto each end by an integral joining technique to form the interior chamber 122. For example, the base 102 may be formed of two rectangular tubes of similar size that are welded together to form a final shape, and then rectangular end caps 104, 106 may be welded to the remaining ends.

The tubing 108 and end caps 104, 106 may be made of a steel alloy such as A36 having a minimum yield strength of 36 ksi and minimum ultimate tensile strength 58 ksi or other similar steel alloy.

The plurality of pipe assemblies 130 may be connected to the bottom wall 116 near the end caps 104, 106. The first pipe 132 may have a first end 134 without threads and a second end 136 having National Pipe Threads (NPT). The first end 134 of the first pipe 132 may be integrally joined to the bottom wall 116 and open to the interior chamber 120 of base 102 through an opening 126 in the bottom wall 116 sized to coincide with an outer diameter of the first pipe 132. The opening 126 may be a hole sized to be substantially the same as the outer diameter of the first pipe 132. The outer diameter of the first pipe 132 may be approximately 1.25 inches, or within a range of 1.0 inches and 1.5 inches. The first pipe 132 may have an inner diameter of approximately 1.0 inches, or within a range of 0.75 inches or 1.25 inches. The first pipe 132 may have a length of approximately 3.0 inches or within a range of 2.5 inches to 3.5 inches, or within a range of 2.0 inches to 4.0 inches. Additionally, the first pipe 132 may be made of a carbon steel alloy that meets ASTM A53 standards.

Each of the first pipes 132 may connect to a fitting 144. Fitting 144 may have a threaded first end 146 and a threaded second end 148. The fitting 144 may also have a 1.0 inch inner diameter and 45 degree bend positioned within the center of each fitting 144. Each first pipe 132 may be connected with the corresponding threads the first end 146 of the fitting 144. In addition to having the threaded connection connecting the first pipe 132 and fitting 144, an integral joining technique may be included to ensure they are joined securely. Each fitting 144 may be made of a steel alloy to meet class 2000 pound requirements.

Additionally, each of the second ends 148 of the fittings 144 may be connected to a second pipe 138. Each second pipe 138 may have a first end 140 and a second end 142 both with NPT. The first end 140 of each second pipe 138 may be connected to the second end 148 of each fitting 144. Each second pipe 138 may have the same length of approximately 4.438 inches or within a range of 4.25 inches to 4.75 inches, or within a range of 4.0 inches to 5.0 inches. The second pipe 138 may have the same inner and outer diameters of the first pipe 132 and be made of the same material as the first pipe 132.

Each of the second pipes 138 may also be connected to a bushing 150. Each bushing 150 may have a first end 152 with an NPT female thread and a second end 154 with an NPT male thread. Each bushing 150 may have a hexagon shaped flange near the first end 152. The first end 152 may have an inner diameter of approximately 1.0 inch while the second end 154 may have an inner diameter of approximately 2.0 inches. Bushing 150 may be made of a steel alloy.

In the example embodiment of FIG. 1, the steam jacket 100 has two pipe assemblies 130 where one acts as an inlet and the other as an outlet. However, the steam jacket may have any number of pipe assemblies.

Lastly, a plurality of mounting brackets 160 may be positioned underneath and connected to the bottom wall 116. The mounting brackets 160 may comprise a plurality of walls with a first wall 162 connecting to the bottom wall 116, a second wall 164 generally perpendicular to the first wall 162 extending away from the first wall 162 and the bottom wall 116, and a third wall 166 extending generally parallel and away from the first wall 162. The mounting brackets may also have a hole 168 positioned in the third wall 166. The mounting brackets 160 may be joined to the bottom wall 116 using an integral joining technique.

Figure 4:
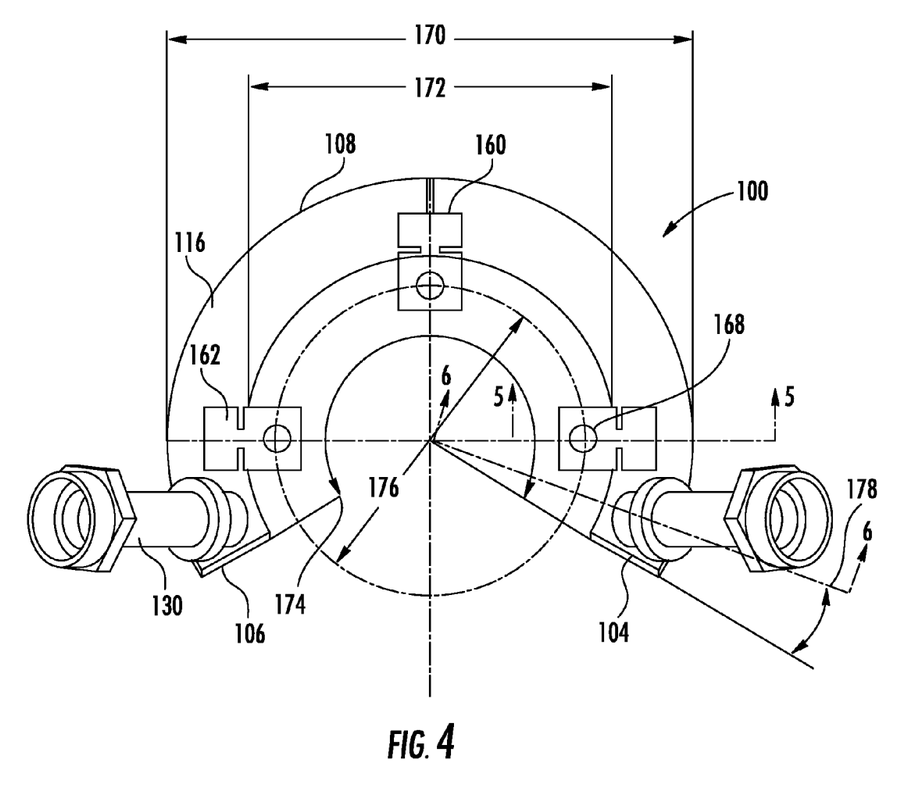
FIG. 4 depicts a top view of the example removable bottom outlet valve steam jacket of FIG. 1, according to one or more aspects described herein.

FIG. 4 shows the tubing 108 may have a partially annular shape that has an outer diameter 170 and an inner diameter 172 where the outer diameter 170 may be approximately 13.25 inches, or within a range of 13.0 inches to 13.5 inches, or within a range of 12.5 inches to 14.0 inches. Additionally, the inner diameter 172 may be approximately 9.25 inches, or within a range of 9.25 inches and 9.32 inches, or within a range of 9.0 inches and 9.5 inches. The base may have a partial annular shape where the angle between the end caps forms an obtuse angle. The angle 174 formed between the end caps 104 and 106 may be greater than 180 degrees. For example, the angle 174 may be approximately 240 degrees, or may be within a range between 220 degrees to 260 degrees.

Also, shown in FIG. 4, the plurality of mounting brackets 160 may be positioned where the mounting holes 168 are located along a diameter 176 centered along the center point of the tubing 108. The diameter 176 may be approximately 7.75 inches or within a range of 7.5 inches to 8 inches. Additionally, the mounting brackets 160 may be located such that they are equally spaced from each other. For example, the mounting brackets 160 may be placed approximately 90 degrees apart from each other. The BOV steam jacket 100 may have any number of mounting brackets 160. In the example embodiment shown in FIG. 4, the BOV steam jacket 100 has three mounting brackets 160.

FIG. 4 also shows the location of the pipe assemblies 130. The pipe assemblies 130 are located near the end caps 104, 106 and may be connected to the tubing 108 at a position defined by angle 178 from each end cap 104, 106, where the angle 178 may be approximately 10 degrees. However, the angle 178 may be within a range of approximately 5 degrees to 25 degrees.

Figure 5:
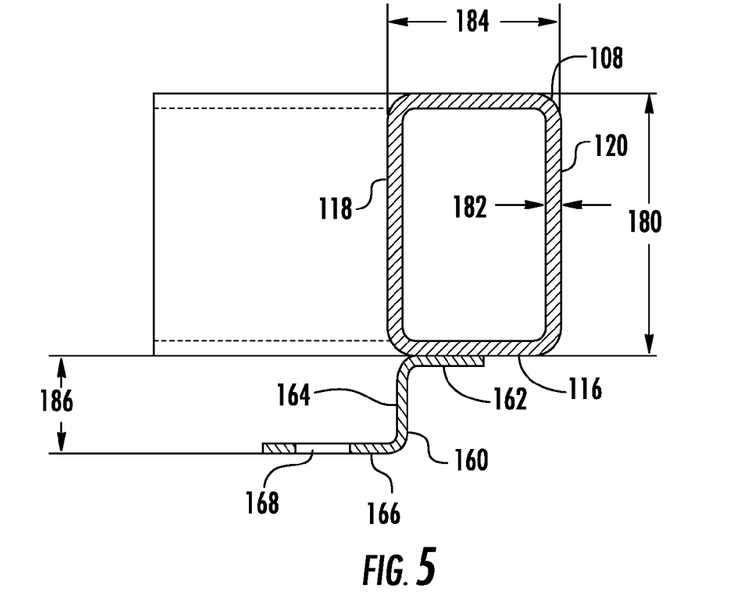
FIG. 5 depicts a cross-sectional view along line 5-5 in FIG. 4 of the example removable bottom outlet valve steam jacket of FIG. 1, according to one or more aspects described herein.

FIG. 5 shows a cross-section of the example embodiment of FIG. 1 passing through one of the mounting brackets 160. As shown, the tubing 108 may have any cross-section such as a rectangle, square or other polygon. For example, in the embodiment shown in FIG. 1, the tubing 108 may have a rectangular cross-section with a height 180 of approximately 3 inches or within a range of 2.5 inches to 3.5 inches and a wall thickness 182 of approximately 0.188 inches or within a range of 0.125 inches to 0.25 inches. The height 180 of the tubing may be greater than the width 184 to allow the inner wall 118 to have a larger surface area than the surface area of the top wall 114 to transfer heat more efficiently since the inner wall 118 is closest to the BOV 20.

FIG. 5 also shows the mounting bracket in the example embodiment having a plurality of walls with a general S-shape where a first wall 162 connects to the bottom wall 116 of the tubing 108. A second wall 164 may be positioned generally perpendicular to the first wall 162 and directed away from the bottom wall 116. A third wall 166 may be positioned generally perpendicular to the second wall 164 and directed away from the inner wall toward a center axis of the tubing 108. The mounting bracket 160 may have an overall height 186 of approximately 1.125 inches from a top surface of the first wall 162 to a bottom surface of the third wall 166, or within a range of 0.75 inches to 1.5 inches. Additionally, the mounting bracket 160 may be made of a steel alloy such as A36. A hole 168 may be placed through the third wall 166. The mounting bracket 160 may have a substantially constant wall thickness and be formed from a steel sheet.

FIG. 6 shows another cross-section of the example embodiment of FIG. 1 passing through one of the pipe assemblies 130. As shown, the walls, 114, 116, 118, and 120 form to make an interior cavity 122. Additionally, the first pipe 132 may have a first end 134 connected to the tubing opening 126 in the bottom wall 116, where the first pipe 132 is inserted into the opening 126. The pipe 132 may be connected such that the first end of the first pipe 132 is substantially planar with the inside surface 128 of the bottom wall 116. The first pipe 132 may be connected with an integral joining technique.

Figure 7:
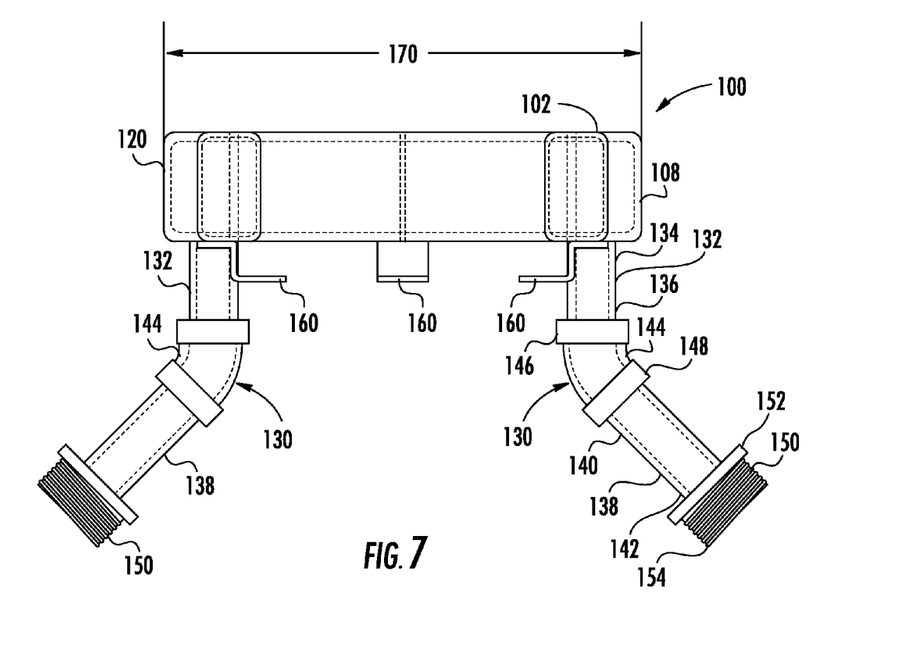
FIG. 7 depicts a front view of the example removable bottom outlet valve steam jacket of FIG. 1, according to one or more aspects described herein

FIG. 7 shows a front view of the example embodiment of FIG. 1 demonstrating how the pipe assemblies 130 extend away from each other and extend beyond the outside diameter 170 of the tubing 108 such that each fitting 144 may be positioned where the 45 degree bends face away from each other. Also, FIG. 7 shows the plurality of mounting brackets 160 may have together form a plurality of surfaces creating a plane to mount the steam jacket onto a flat surface.

Figure 8:
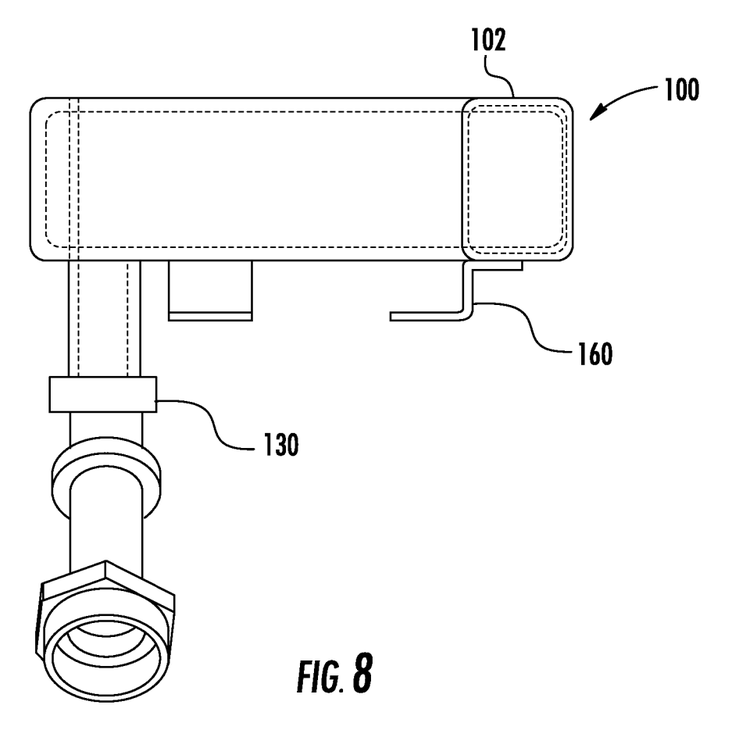
FIG. 8 depicts a side view of the example removable bottom outlet valve steam jacket of FIG. 1, according to one or more aspects described herein.

FIG. 8 shows a side view of the example embodiment of FIG. 1. The pipe assemblies 130 may be oriented within the same plane.

As a means of testing the removable BOV steam jacket 100, the BOV steam jacket 100 may be hydrostatic pressure tested up to 175 psi to check for leaks. Lastly, being primarily a steel construction, the BOV steam jacket 100 may have a coating to help protect it from corrosion.

A method of forming a removable steam jacket 100 for a bottom outlet valve of a railroad tank car may comprise the steps of: forming a base 102 comprising a tubing 108 comprising a first end 110, a second end 112, a top wall 114, a bottom wall 116, an inner wall 118, and an outer wall 120; integrally joining a first end cap 104 to the first end of the tubing and a second end cap 106 to the second end of the tubing; creating an opening 126 in the bottom wall 116 of the tubing 108 near the first end 110 and the second end 112; forming a plurality of pipe assemblies 130 by connecting a first pipe 132, a fitting 144, a second pipe 138, and a bushing 150; where the second end 136 of the first pipe 132 connects to the first end 146 of the fitting 142, the second end 148 of the fitting 144 connects to the first end 140 of the second pipe 138, the second end 142 of the second pipe 138 connects to the first end 152 of the bushing 150; forming a plurality of mounting brackets 160 comprising a first wall 162, a second wall 164 generally perpendicular to the first wall 162, and a third wall 166 generally parallel to the first wall 162, and a hole 168; connecting the plurality of pipe assemblies to the base by inserting the first end 134 of each first pipe 132 into its corresponding opening 126 in the bottom wall 116 of the tubing 108; connecting each mounting bracket 160 to the bottom wall 116 of the tubing 108. Additionally, the mounting brackets 160 and pipe assemblies 130 may be connected using an integral joining technique.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A removable steam jacket for a bottom outlet valve of a railroad tank car, comprising:
    a base comprising a first end cap, a second end cap, and a hollow tubing having a first end, a second end, a top wall, a bottom wall, an inner wall, and an outer wall;
    wherein the first end cap is connected to the first end of the hollow tubing and the second end cap is connected to the second end of the hollow tubing forming an interior cavity;
    a plurality of mounting brackets connected to the bottom wall;
    a plurality of pipe assemblies located proximate the first end cap and the second end cap; and
    wherein the pipe assemblies extend away from the bottom wall of the tubing.

2. The removable steam jacket of claim 1, wherein each of the plurality of pipe assemblies comprise a first pipe, a second pipe, a fitting, and a bushing.

3. The removable steam jacket of claim 1, wherein the base has a partially annular shape wherein an angle formed between the first end cap and the second end cap is greater than 180 degrees.

4. The removable steam jacket of claim 1, wherein an inner diameter of the tubing is in a range between 9.0 inches and 9.5 inches.

5. The removable steam jacket of claim 1, wherein the tubing has a rectangular cross-section.

6. The removable steam jacket of claim 1, wherein the tubing has a height that is larger than a width.

7. The removable steam jacket of claim 1, wherein the plurality of mounting brackets are positioned equal distance apart and that a hole on each mounting bracket is positioned on a diameter centered at a center of an inner diameter of the tubing.

8. The removable steam jacket of claim 1, wherein each of the pipe assemblies extends away from each other and extends beyond an outside diameter of the tubing.

9. The removable steam jacket of claim 2, wherein the first pipe and the second pipe have an inner diameter of approximately 1.0 inches and the bushing has an inner diameter on the second end of approximately 2.0 inches.

10. The removable steam jacket of claim 1, wherein the steam jacket has a weight less than 25 pounds.

11. The removable steam jacket of claim 1, wherein the steam jacket is installed and removed with a plurality of mechanical fasteners.

12. A removable steam jacket for a bottom outlet valve of a railroad tank car, comprising:
    a base comprising a first end cap, a second end cap, and a hollow tubing having a rectangular cross-sectional shape and a first end, a second end, a top wall, a bottom wall, an inner wall, and an outer wall;
    wherein the first end cap is connected to the first end of the hollow tubing and the second end cap is connected to the second end of the hollow tubing forming an interior cavity;
    a plurality of mounting brackets connected to the bottom wall of the tubing;
    a plurality of pipe assemblies located proximate the first end cap and the second end cap; and
    wherein the pipe assemblies connect to the bottom wall of the tubing;
    wherein the re movable steam jacket is installed and removed by a plurality of mechanical fasteners.

13. The removable steam jacket of claim 12, wherein each of the plurality of pipe assemblies comprise a first pipe, a second pipe, a fitting, and a bushing.

14. The removable steam jacket of claim 12, wherein the tubing has a partially annular shape.

15. The removable steam jacket of claim 12, wherein an inner diameter of the tubing is in a range between 9.0 inches and 9.5 inches.

16. The removable steam jacket of claim 12, wherein the tubing has a height that is larger than a width.

17. A The removable steam jacket of claim 13, wherein the first pipe and the second pipe have an inner diameter of approximately 1.0 inches and the bushing has an inner diameter on the second end of approximately 2.0 inches.

18. The removable steam jacket of claim 12, wherein the steam jacket has a weight less than 25 pounds.

19. A method of forming a removable steam jacket for a bottom outlet valve of a railroad tank car comprising:
    forming a base comprising a tubing comprising a first end, a second end, a top wall, a bottom wall, an inner wall, and an outer wall;
    connecting a first end cap to the first end of the tubing and a second end cap to the second end of the tubing;
    creating an opening in the bottom wall of the tubing near the first end and the second end;
    forming a plurality of pipe assemblies by connecting a first pipe, a fitting, a second pipe, and a bushing;
    wherein the second end of the first pipe connects to the first end of the fitting, the second end of the fitting connects to the first end of the second pipe, and the second end of the second pipe connects to the first end of the bushing;

forming a plurality of mounting brackets comprising a first wall, a second wall generally perpendicular to the first wall, and a third wall generally parallel to the first wall, and a hole;

connecting the plurality of pipe assemblies to the base by inserting the first end of each first pipe into its corresponding opening in the bottom wall of the tubing; and connecting each mounting bracket to the bottom wall of the tubing.

20. The method of making a removable steam jacket of claim 19, wherein the first end cap and the second end cap are connected to the tubing by welding; the plurality of pipe assemblies are connected to the tubing by welding; and the mounting brackets are connected to the tubing by welding.

\* \* \* \* \*